Figure 1:
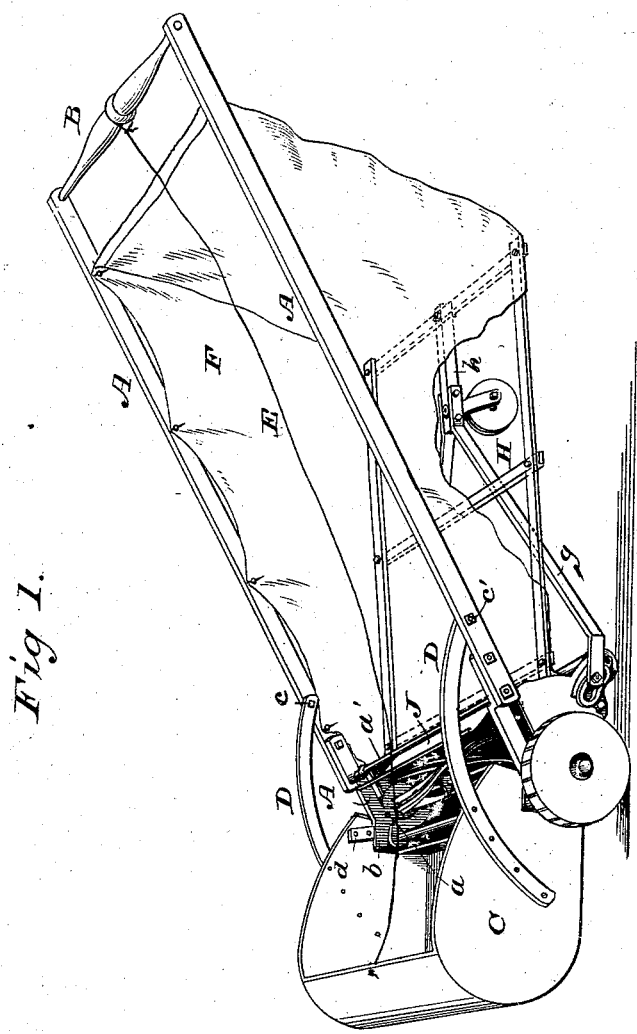

(No Model.)

2 Sheets—Sheet 1.

E. G. PASSMORE.
Lawn Mower.

No. 241,508.

Patented May 17, 1881.

Witnesses.
Wm A. Skinkle
Geo. W. Breck

Inventor.
E. G. Passmore.
by Henry Baldwin Jr
Atty.

N. PETERS, Photo-Lithographer, Washington, D. C.

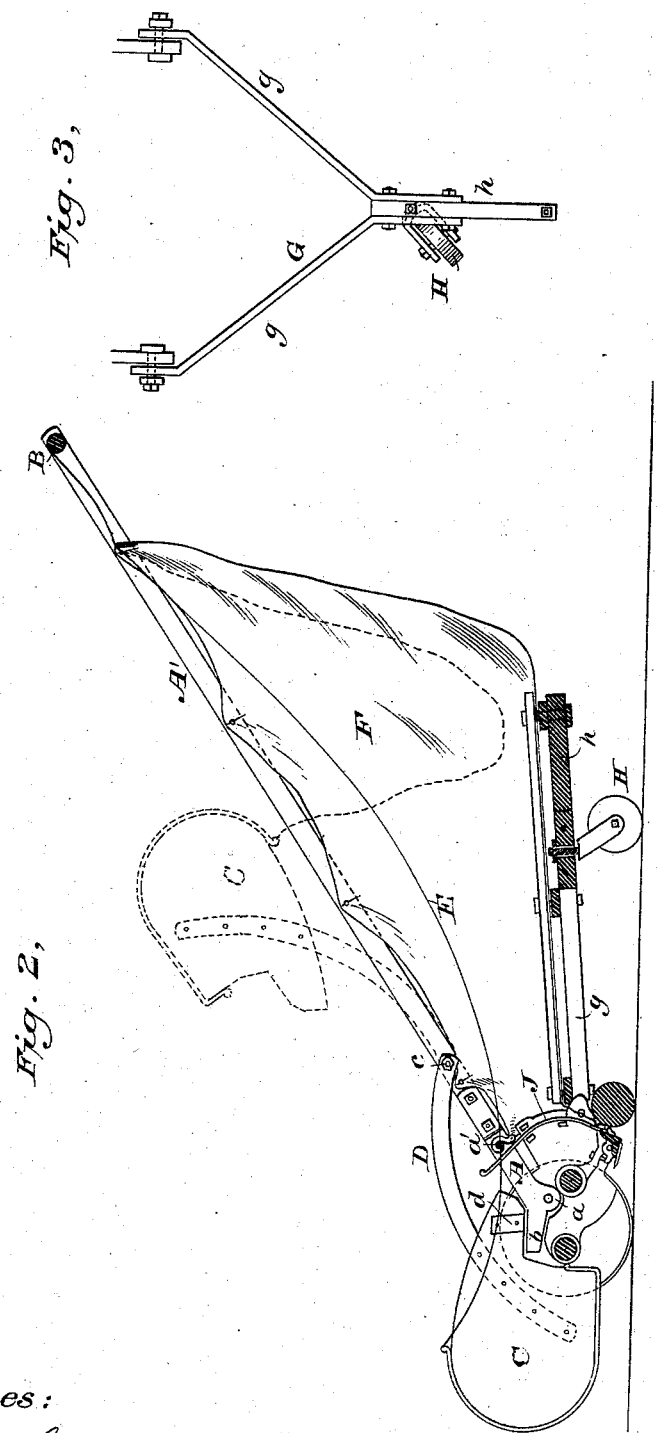

UNITED STATES PATENT OFFICE.

EVERETT G. PASSMORE, OF PHILADELPHIA, PENNSYLVANIA.

LAWN-MOWER.

SPECIFICATION forming part of Letters Patent No. 241,508, dated May 17, 1881.

Application filed February 28, 1881. (No model.)

*To all whom it may concern:*

Be it known that I, EVERETT G. PASSMORE, of the city and county of Philadelphia, in the State of Pennsylvania, have invented certain new and useful Improvements in Lawn-Mowers, of which improvements the following is a specification, reference being had to the accompanying drawings, which form part hereof, and in which—

Figure 1 is a perspective view of a lawn-mower embodying my invention; Fig. 2, a vertical longitudinal section through the center of the same, the rotary cutters being removed; and Fig. 3, a view of the upper side of the caster-frame detached from the machine.

It is the object of my invention to combine with a lawn-mowing machine a grass collecting and receiving attachment, light and manageable, yet of large capacity, adapted to conform to the ordinary movements of the machine, and subject to the control of the operator.

In the accompanying drawings, which form part of this specification, I have shown my improvements applied in the most approved form to a lawn-mower of a now well-known construction, for the details of which I may refer to the Reissued Letters Patent No. 8,560, granted to me under date of January 28, 1879, though these details form no part of the invention herein claimed.

In a lawn-mowing machine, the frame which supports the cutting apparatus should be made pivotal about the axis of the supporting traction-wheels, so as to enable the cutters to follow the inequalities of the ground independently of the traction-wheels, and I contemplate using and accordingly have shown such a frame in the accompanying drawings.

I make two short metal arms, A, Fig. 2, flat-sided and angled outward toward their rear ends. The forward ends of these arms respectively are provided with a heel, $a$, through which it is to be pivoted at one side to the frame of the machine, and a toe, $b$, which projects forward beyond this point, for a purpose to be presently described. The forward ends of the arms A being pivoted to the sides of the frame, I bolt to the rear end of each of the arms a wooden handle, A', which extends back a proper distance, and I connect the rear end of these handles by the cross-bar B, thus composing of the arms A, the handles A', and the cross-bar B a bail pivoted to the frame of the machine. At the front ends of the handles A', I insert through them, and through the arms A, a cross-rod, $a'$, to brace the forward end of the bail.

A collector or gathering-box, C, of the general form shown in the drawings, is made of sheet metal or other suitable light material, and is hinged to the handles A' at $c$ by means of the curved bearers D, the bottom of the box fitting close in front of the rotary cutters. The sides of the box have lugs $d$, which fit over the toes $b$ on the arms A, so that when the outer end of the bail is depressed the toes $b$ will be locked under the sides of the box, and thus the bail will sustain the weight of the box and prevent it from bearing down on the forward part of the frame or from resting upon the ground. By thus supporting or sustaining the weight of the gathering-box on the pivoted bail and in front of the rotary cutter I prevent any disturbance of the equilibrium of the cutting apparatus and its frame.

A cord, E, attached to the front of the gathering-box, extends back to the cross-bar B of the bail, and by this cord the operator can at any time raise and lower the gathering-box, and can turn it back on the pivots of its bearers D until it reaches the position shown in dotted lines in Fig. 2, when any grass that has been gathered in the box will be dumped out at its open side between the handles and in rear of the cutting apparatus.

The capacity of a gathering-box in such a machine being necessarily limited, and it being desirable to run the machine with fewer stoppages for discharging the gathered grass than would be necessary where such a box only was used, I combine with the cutting-apparatus and the collector or gathering-box a receiver, F, which I attach to the handles A' behind the cutting apparatus. This receiver may be simply a light open box or strong bag depending from the handles, and thus kept in place and readiness to have the contents of the gathering-box dumped into it at intervals, as will presently be described.

In order again to extend the capacity of such a receiver beyond what would be practicable when it and its contents are entirely sustained by the handles of the machine, and their weight thus necessarily borne by the operator, I provide the following device: I make a frame, G, Fig. 3, of which the spread ends of the arms $g$ $g$ are pivoted to the frame which supports the cutting apparatus, (so as to turn freely on such pivots,) while the stem $h$, to which the converging ends of the arms $g$ $g$ are attached, is supported by a caster-wheel, H. By means of this pivoted connection to the cutter-frame and this caster-wheel support the frame G will not only follow the undulations of the ground without disturbing the cutter-frame, but will also adapt itself to the deflections of the machine to the right or left. Upon this caster-frame I place a platform of light frame-work or of cloth stretched upon a frame extending back from behind the fixed cutter and lying under the handles A' A'. In the angle between the sides and rear end of the platform and the handles A', I fit strong cloth, so as to inclose the space between the platform and the bail, thus forming a receiving-box of large capacity suspended from the bail, but supported on the caster-frame, so as to relieve the handles A' from the weight of the load. Owing to the flexibility of the cloth the sides of the receiver will fold up somewhat in the manner of a bellows as the caster-frame is raised or the bail depressed, while in backing the machine the lifting of the bail will necessarily tend to lift the platform and the caster-frame. The sides and end of the receiving-box, instead of being made of cloth, may be made of light frame-work or of metal put together in sections, so that one section will slide past the other, as in a telescope; but I prefer the cloth as a more simple construction.

It will readily be seen that when the gathering-box is brought into the position shown in Fig. 2 the grass therein will be dumped into the receiver, and the box C may then be restored to its place in front of the machine and again filled and again dumped into the receiver, and this may be repeated until the receiver is filled, when the machine may be trundled to one side and the receiver itself emptied by overturning it on the axis of the machine, so as to dump its contents between the handles onto the ground.

As the rotary cutters naturally tend to throw the cut grass backward, and as it is desirable to reverse the direction in which the grass is thrown, I interpose a thin metal deflecting plate or shield, J, behind the rotary cutter and between it and the front end of the platform, curving this shield forward over the rotary cutters, as shown in the drawings. To sustain the shield in place, I form lugs on the inner faces of the side plates of the frame supporting the cutting apparatus, and simply slide the shield in between these lugs, resting the bottom edge of the shield upon the back of the fixed cutter.

The operation is as follows: The machine being arranged as shown in Fig. 1, it is pushed forward by means of the bail, and the cut grass is deflected by the shield into the collector or gathering-box C. When the gathering-box is full it is reversed on its bearers, as already described, and dumped into the receiver, and the receiver when full is dumped at any point desired, the combined operation of cutting and collecting going on simultaneously, without any disturbance of the evenness of the work, since the gathering attachments do not interfere with the proper operation of the cutting apparatus and the pivotal features of this frame.

If it is desired to cut the grass close up to shrubbery, trees, or other obstructions in its path, the gathering-box C is turned back into the position shown by the dotted lines in Fig. 1, and the shield J is temporarily removed. The cutters will then be free to work close to the obstruction, and the grass cut at such moments will be thrown back directly into the receiver. When the path for the machine is clear the shield is replaced, the box C is restored to its position in front of the cutters, and the ordinary gathering operation of the machine, as first above described, resumed.

I am aware that a reversible collector hinged to a pivoted bail is old, as it will be found described in English Letters Patent No. 538, granted to me under date of February 19, 1872, and I do not herein claim such combination broadly; but in said English patent the collector is supported on the frame that supports the cutting apparatus, and the weight of the collector and its contents was found to overbalance the weight of the cutters and lift them from the ground, thereby preventing the floating operation of the cutter-frame, while one of the objects of my present improvements is to so combine the collector or gathering-box with the cutting apparatus and its frame that the weight of the box and its contents will be sustained by the bail, and thus leave the cutting apparatus free to follow the inequalities of the ground, as already mentioned.

Having thus described the nature and object of my improvements, what I claim as new, and desire to secure by Letters Patent, is—

1. The combination, with the pivoted bail, of a reversible collector or gathering-box supported by the bail, so as to prevent disturbance of the equilibrium of the cutting apparatus, substantially as described.

2. The combination, with the collector and the bail, of the toes $b$, substantially as and for the purposes set forth.

3. The combination, with the rotary cutting apparatus and its supporting and driving mechanism, of a reversible collector in front and a receiver in rear of the cutting apparatus, substantially as and for the purposes set forth.

4. The combination, with the rotary cutting apparatus, of the collector, the receiver, and the shield interposed between the cutting apparatus and the receiver, substantially as and for the purposes set forth.

5. The combination, in a lawn-mower, of a pivoted bail, a caster-frame, and a bellows or telescope receiver connecting said bail and caster-frame, substantially as and for the purposes set forth.

6. The combination, in a lawn-mower, of a rotary cutting apparatus, a pivoted bail, a reversible collector, a caster-frame, and a flexible receiver connecting the bail and caster-frame, substantially as and for the purposes described.

EVERETT G. PASSMORE.

Witnesses:
J. WALTER DOUGLASS,
GEO. F. FINDLAY.